(12) United States Patent  
Marchlewski et al.

(10) Patent No.: US 9,919,641 B2
(45) Date of Patent: Mar. 20, 2018

(54) PICKUP TRUCK STAKE-POCKET ASSEMBLIES

(71) Applicant: Ford Global Technologies, LLC, Dearborn, MI (US)

(72) Inventors: Jack Marchlewski, Saline, MI (US); Joshua R. Hemphill, White Lake, MI (US); Dragan B. Stojkovic, Taylor, MI (US); John Comiez, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/186,637

(22) Filed: Jun. 20, 2016

(65) Prior Publication Data

US 2017/0361756 A1 Dec. 21, 2017

(51) Int. Cl.
*B60P 7/08* (2006.01)
*B62D 33/02* (2006.01)
*B62D 33/023* (2006.01)

(52) U.S. Cl.
CPC .......... *B60P 7/0807* (2013.01); *B62D 33/023* (2013.01)

(58) Field of Classification Search
CPC ............................ B60P 7/0807; B62D 33/023
See application file for complete search history.

(56) References Cited

U.S. PATENT DOCUMENTS

| | | |
|---|---|---|
| 5,954,381 A | 9/1999 | Theriot et al. |
| 6,039,520 A | 3/2000 | Cheng |
| 6,422,635 B1 | 7/2002 | Steffens et al. |
| 8,376,674 B1 * | 2/2013 | Davis, III ............... B60P 7/083 410/100 |

* cited by examiner

*Primary Examiner* — D Glenn Dayoan
*Assistant Examiner* — Melissa A Black
(74) *Attorney, Agent, or Firm* — Jason Rogers; Brook Kushman, P.C.

(57) ABSTRACT

A pickup-truck box includes a bed and a sidewall connected to a longitudinal side of the bed. The sidewall includes an inner panel, an outer panel, and a top rail. The top rail defines a stake-pocket hole and extends between the panels to define a sidewall interior. A stake-pocket bracket includes a tubular body defining an opening. The bracket is disposed within the sidewall interior with a first side of the tubular body secured to the inner panel at a location that vertical aligns the opening with the hole to receive an object within the opening.

17 Claims, 5 Drawing Sheets

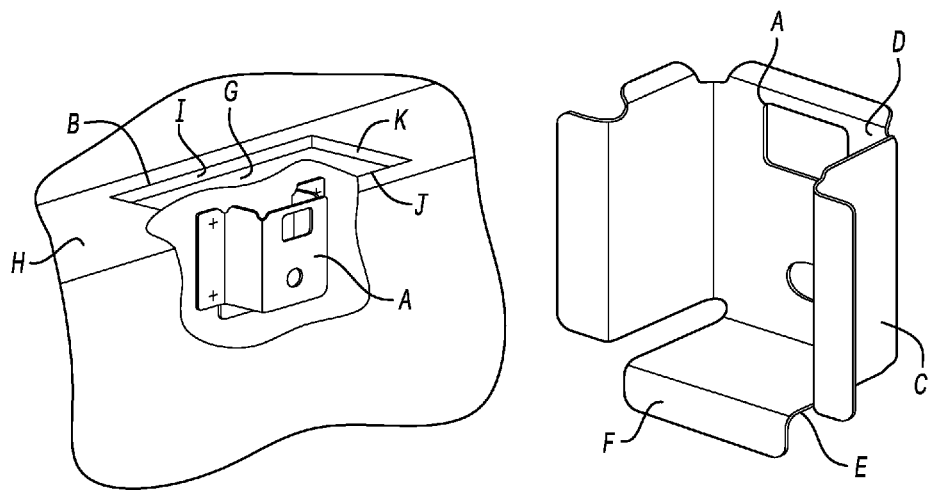
Fig-1A
PRIOR ART
Fig-1B
PRIOR ART
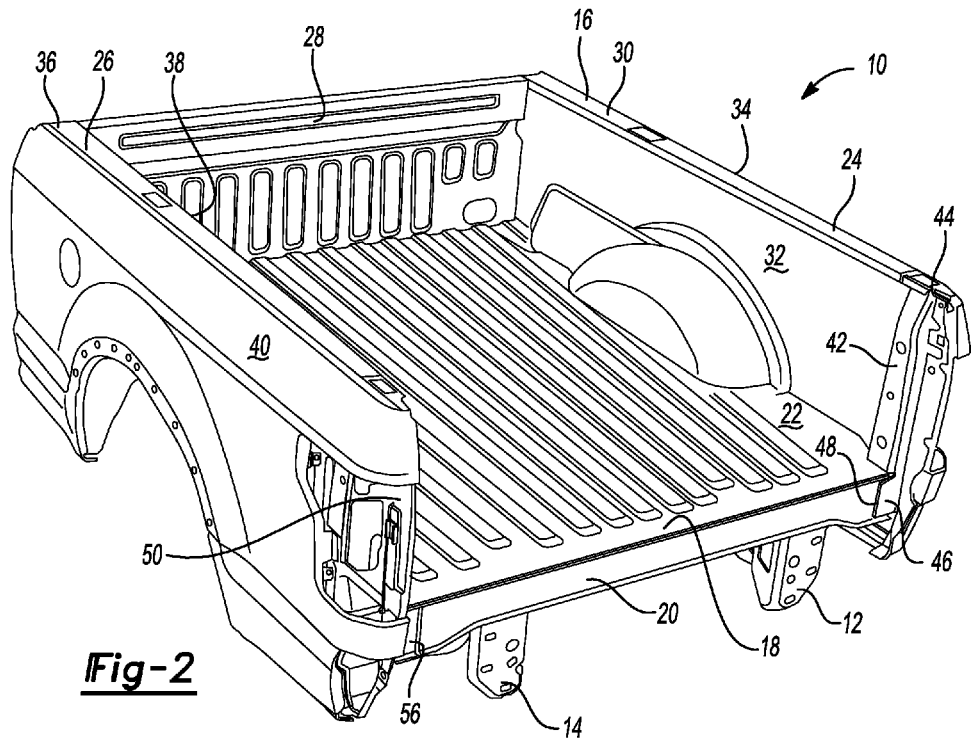
Fig-2

PICKUP TRUCK STAKE-POCKET ASSEMBLIES

TECHNICAL FIELD

This disclosure relates to stake-pocket assemblies provided in a sidewall of a pickup-truck box.

BACKGROUND

Pickup trucks include a box having a bed, opposing sidewalls, a header and a tailgate. The box is attached to and supported by the chassis. The box may be equipped with toolboxes, ladder racks, tie-downs and other equipment that exert equipment loads on the sidewalls. These loads are transferred from the box to the chassis through the bed.

Attaching aftermarket accessories to the sidewalls is a challenge as original equipment manufacturers (OEMs) limit the mounting options for aftermarket accessories on the vehicle. Aftermarket-accessory producers often must include mounting hardware with the accessory. Accessory mounting hardware may require modifications to the vehicle that are permanent.

Referring to FIGS. 1A and 1B (PRIOR ART), some OEMS have recently provided structures within the sidewall that cooperate with the stake-pockets. For example, Ford Motor Company has added a stamped bracket "A" below the stake pocket "B". The bracket includes two side panels "C", an outer panel "D", and a bottom panel "E". Some of the panels have a flange "F" that is welded to an outer surface of the box inner "G". The bracket "A" lacks an inner panel and thus is not a fully boxed structure.

The stake pocket "B" is defined by the top rail "H" and has an inner side "I", an outer side "J", and a pair of interconnecting sides "K". The stake pocket "B" is centered in the top rail "H" thus, the inner side "I" is spaced laterally outboard of the box inner "G". This lateral offset creates a pivot point at the inner side "I". An object (e.g., a leg of an after-market accessory) received within the stake pocket "B" pivots at the inner side until the object hits the box inner "G". Many aftermarket accessories should be securely connected to the box so they do not pivot or wobble. The bracket "A" does not prevent pivoting of objects received within the stake pocket because the bracket "A" does not include an inner panel. Since the bracket "A" lacks an inner panel, the stake pocket "B" provides structural support for objects received in the pocket.

SUMMARY

According to one embodiment, a pickup-truck box includes a bed and a sidewall connected to a longitudinal side of the bed. The sidewall includes an inner panel, an outer panel, and a top rail. The top rail defines a stake-pocket hole and extends between the panels to define a sidewall interior. A stake-pocket bracket includes a tubular body defining an opening. The bracket is disposed within the sidewall interior with a first side of the tubular body secured to the inner panel at a location that vertical aligns the opening with the hole to receive an object within the opening.

According to another embodiment, a pickup-truck box includes a sidewall defining a stake-pocket hole in a top rail. A stake-pocket bracket is disposed inside the sidewall below the hole such that an object inserted into the hole is received within a tubular sleeve of the bracket. The tubular sleeve includes an inboard side having a part engaging surface that is outboard of the inner panel.

According to yet another embodiment, a pickup truck includes a frame and a box supported by the frame. The box includes a header, a pair of longitudinal sidewalls extending rearwardly from the header, and a bed connected to the header and sidewalls. At least one of the sidewalls includes inner and outer panels spaced apart to define an interior, a top rail spanning the inner and outer panels. The top rail defines a stake-pocket hole providing access into the interior. A bracket is disposed in the sidewall and includes a sleeve having an inboard part engaging surface configured to engage an inboard surface of an elongate member received in the sleeve.

BRIEF DESCRIPTION OF THE DRAWINGS

FIG. 1A is a fragmentary perspective view of a prior art stake pocket and bracket.

FIG. 1B is a perspective view of a prior art bracket for the stake pocket shown in FIG. 1A.

FIG. 2 is a rear perspective view of a pickup truck with a tailgate removed.

DETAILED DESCRIPTION

Figure 3:
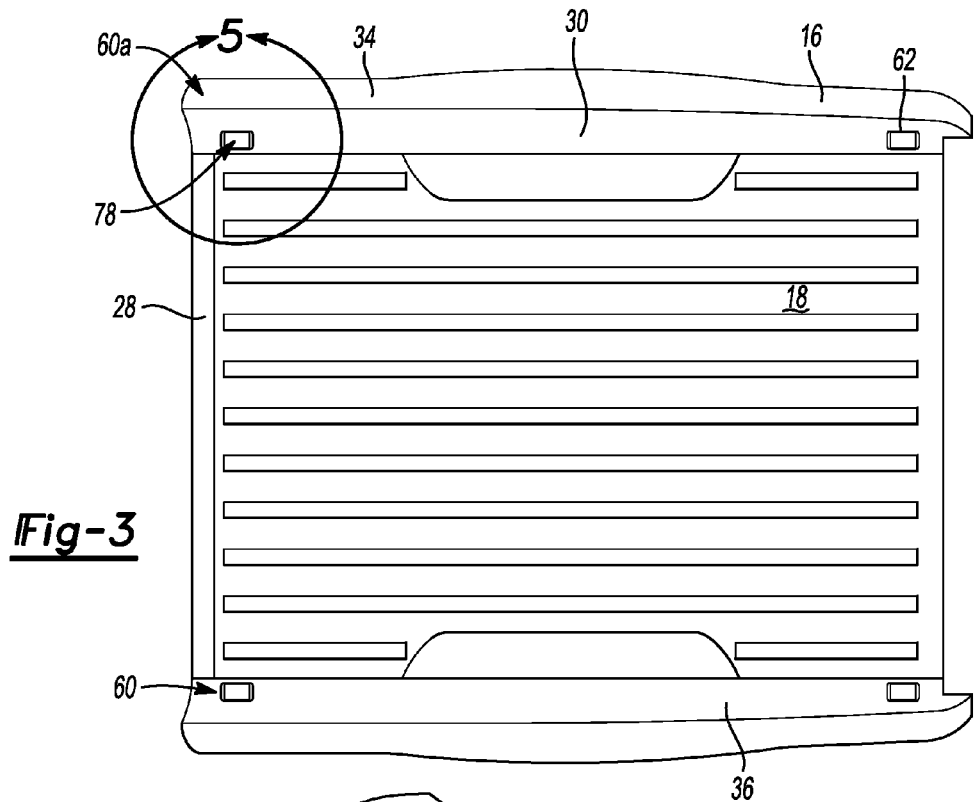
FIG. 3 is a plan view of a box of a pickup truck.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

FIG. 2 illustrates a rear portion of a pickup truck 10. The pickup truck 10 includes a frame having a first longitudinal frame rail 12 and a second longitudinal frame rail 14. The pickup truck 10 also includes a box 16 that is supported by the first and second frame rails 12, 14. The box 16 includes a bed 18 having lateral support structures that are attached to the first frame rail 12 and the second frame rail 14 at a lower surface of the lateral support structures.

The bed 18 includes a rear sill 20 that defines a lower rear end of the bed 18. The rear sill 20 is attached to the first frame rail 12 and the second frame rail 14 at a lower surface of the rear sill. The bed 18 has a floor surface 22 attached to a top surface of the lateral support structures and a top surface of the rear sill 20. The lateral support structures and the rear sill 20 support the floor surface 22 and transfer loads from the floor surface 22 to the frame rails 12, 14. The box 16 includes a first sidewall 24 attached along a first longitudinal side of the bed 18 and a second sidewall 26 attached along a second longitudinal side of the bed 18. A header 28 is connected between the first and second sidewalls 24, 26 at a front portion of the box 16 near the cab. The box may be made of aluminum alloy steel or a composite material.

The first sidewall includes a top surface 30 (also known as a top rail), an inner panel 32, and an outer panel 34. The first sidewall 24 also includes a first pillar 42 disposed between the inner panel 32 and the outer panel 34. The pillar includes a top end 44 and a bottom end 46. The bottom end 46 is attached to the rear sill 20 forming a first joint 48. The first pillar 42 transfers loads from the first sidewall 24 to the rear sill 20 through the first joint 48.

The second sidewall 26 includes a top surface 36 (also known as a top rail), an inner panel 38 and an outer panel 40. The second sidewall 26 also includes a second pillar 50 that is disposed between the inner sidewall 38 and the outer sidewall 40. The second pillar 50 includes a top end and a bottom end. The bottom end is attached to the rear sill 20 forming a second joint 56. The second pillar 50 transfers loads from the second sidewall 26 to the rear sill 20 through the second joint 56. The pillars may be made out of aluminum alloy or steel.

The truck 10 also includes a tailgate (not shown) that is pivotally attached to a rear end of the box 16 between the first sidewall 24 and the second sidewall 26. The tailgate may include a pair of opposing sides that may each include a lower pin. Each lower pin may be received in a corresponding sleeve in one of the first and second pillars 42, 50. The tailgate pivots between an open position and a closed position with the lower pins pivoting inside the sleeves. Each tailgate sidewall includes a latch disposed at an upper portion of the sidewall. The latch cooperates with a corresponding locking post connected to one of the first and second pillars 42, 50. The latch and the locking post engage each other to secure the tailgate in the closed position. The tailgate also includes a handle that cooperates with the latches to disengage the latches from the locking posts to open the tailgate.

Pickup-truck boxes include openings defined in the top rails of the sidewalls. These openings are referred to as stake pockets. Stake pockets may be used as attachment points for tie downs and for receiving projections of aftermarket accessories. Stake pockets are typically punched into the metal stampings forming the top rails. The stake pockets do not usually include substantial structural supports in the sidewall. All of the loads placed on the stake pocket must be supported by the thin sheet-metal that defines the hole. Moderately heavy accessories cannot be mounted to the truck via the stake pockets alone.

FIGS. 3 through 10 and the associated text describe an improved stake-pocket design that is capable of supporting relatively heavy aftermarket accessories without additional brackets. This disclosure presents an improved stake pocket design having a bracket 64 with a fully boxed structure to prevent objects from pivoting or wobbling within the stake pocket assembly 65. In this improved design, the bracket provides all of the structural support and the stake pocket opening 62 in the top rails 30, 36 merely provides access to the bracket 64 disposed within the sidewall. This design allows aftermarket accessories to be attached to the stake pockets without additional mounting brackets and other support structures.

Figure 4:
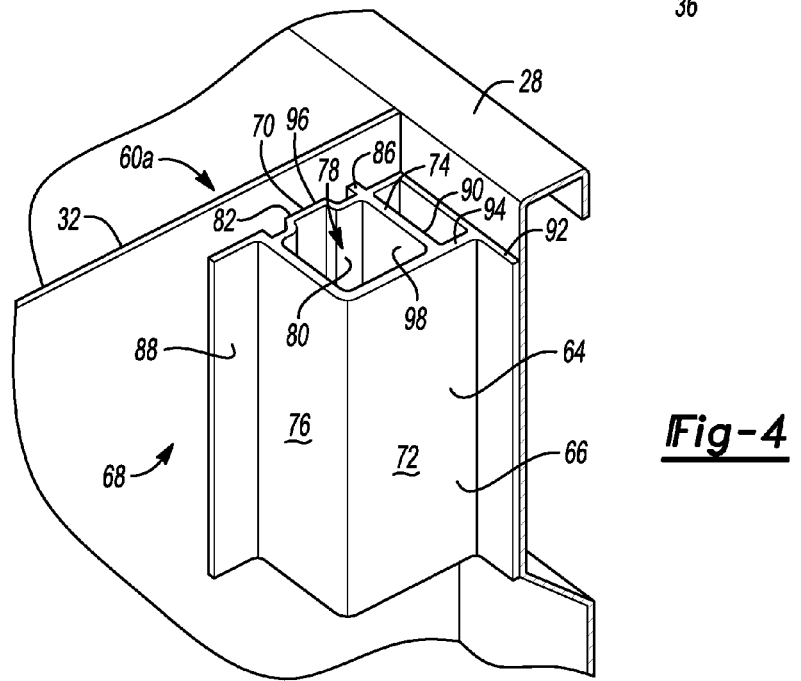
FIG. 4 is a fragmentary perspective view of a stake-pocket assembly located at a front-right corner of the box.
Figure 5:
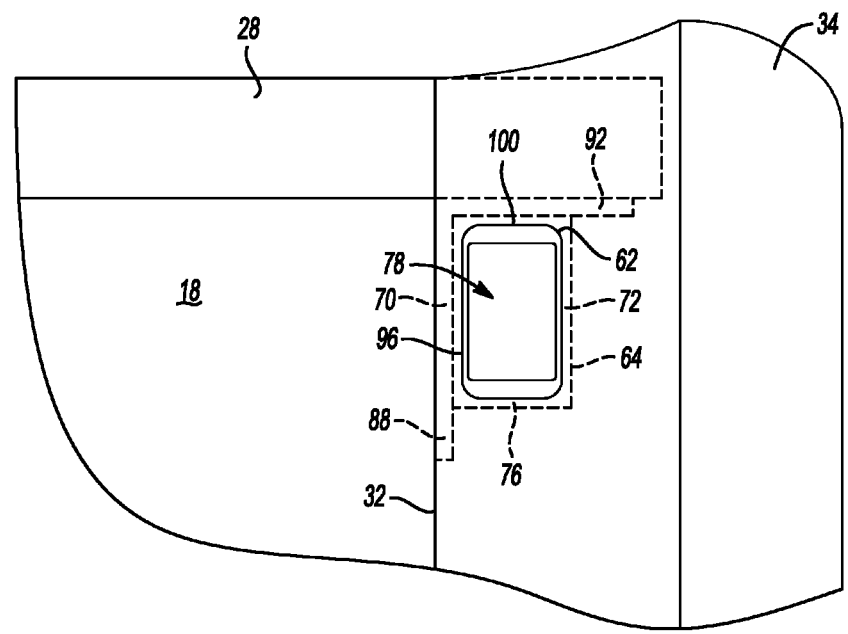
FIG. 5 is a fragmentary plan view of the front-right corner of the box taken within the circle "5" in FIG. 3.

Referring to FIGS. 3, 4, and 5 the pickup-truck box 16 includes at least one stake pocket assembly 60. The illustrated box 16 includes four assemblies 60. Each assembly 60 includes a stake-pocket hole 62 that is defined by one of the top rails 30 or 36, and a stake-pocket bracket 64 that is disposed within the interior 68 of one of the sidewalls 24 or 26. The holes 62 extend completely through the top rail providing access into the interior 68.

Each of the holes 62 has an associated bracket 64 disposed within the interior 68 and vertically aligned with the hole. Each bracket 64 may have an extruded tubular body 66 formed of metal, plastic, or composite. In some embodiments, the bracket 64 may be aluminum alloy or steel. The body 66 may include an inboard sidewall 70, and outboard sidewall 72, a front sidewall 74, and a rear sidewall 76. The sidewalls collectively define a sleeve having an accessory-receiving opening 78. The opening 78 is in vertical alignment with the corresponding hole 62 to facilitate inserting an elongated member of an accessory through the hole 62 and into the opening 78. The diameter of the opening 78 may be equal to or smaller than the diameter of the hole 62.

Depending upon the location of the stake-pocket assembly 60, the bracket 64 may be attached to one of the longitudinal sidewalls 24, 26, the header 28, or one of the D-pillars 42, 50. For example, in assembly 60a, the inboard sidewall 70 includes a box-engaging surface 82 and a flange 88 both mounted to the inner panel 32 of the sidewall 24. The box-engaging surface 82 is disposed on a protruding portion 96 that is inboard of the accessory-engaging surface 80 of the inboard sidewall 70. The protruding portion 96 and the flange 88 may be coplanar with each other. The inboard sidewall 70 also includes a standoff 86 extending inwardly to engage the inner panel 32. The protruding portion 96, standoff 86, and flange 88 cooperate to position the accessory-engaging surface 80 even with, or outboard of, an inner side 96 of the hole 62. The distance between the inner panel 32 and the part-engaging surface 80 may be greater than or equal to the distance between the inner panel 32 and the inner side 96 of the hole 62. Having the accessory-engaging surface 80 even with, or outboard of, the inner side 96 aligns the inboard sidewall 70 with an elongate member. It also prevents the elongate member from pivoting on the inner side 96 of the hole 62.

The front sidewall 74 includes an outer surface 90 that is connected to a flange 92 by a pair of standoffs 94. The flange 92 is mounted to the header 28 and may have a portion that extends outwardly past the outboard sidewall 72. The front sidewall 74 also includes an accessory-engaging surface 98 that is opposite of the outer surface 90. The flange 92 and standoffs 94 cooperate to position the accessory-engaging surface 98 even with, or rearward of, a front side 100 of the hole 62. Having the accessory-engaging surface 98 even with, or rearward of, the front side 100 aligns the front sidewall 74 with an elongate member.

Figure 6:
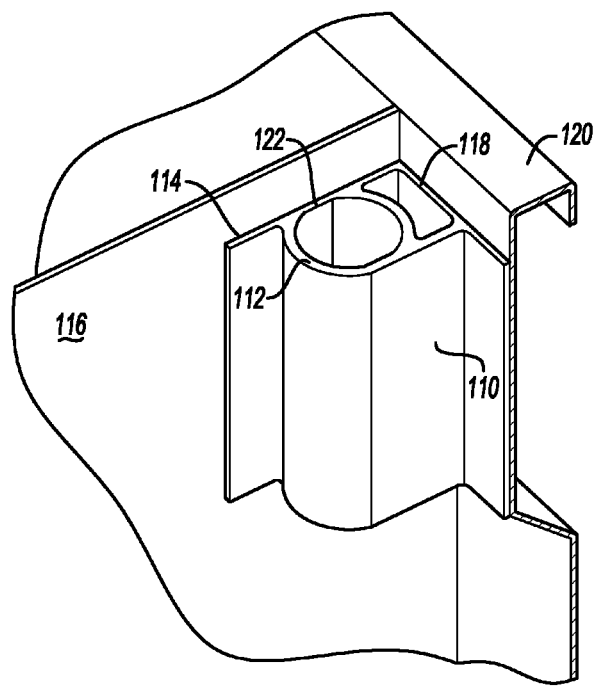
FIG. 6 is a fragmentary perspective view of an alternative embodiment of a stake-pocket assembly.

Referring to FIG. 6, an alternative embodiment of the bracket is illustrated. The bracket 110 includes a circular sleeve 112 instead of the rectangular sleeve shown in FIG. 4. It should be understood that this disclosure is not limited to rectangular or circular sleeves and that the cross-section of the sleeve may be of any shape suitable to receive an elongate member of an aftermarket accessory. The bracket 110 includes a first wall 114 that is mounted to an inner panel 116, and a second wall 118 that is mounted to the header 120. The circular sleeve 112 may be a perfect circle or may include flat spots 122 as shown in FIG. 6. The flat spots 122 inhibit the elongate member from rotating within the sleeve 112. The brackets are illustrated as being mounted to the inner panel, however, the brackets may be mounted to the outer panel of the sidewall.

Figure 7:
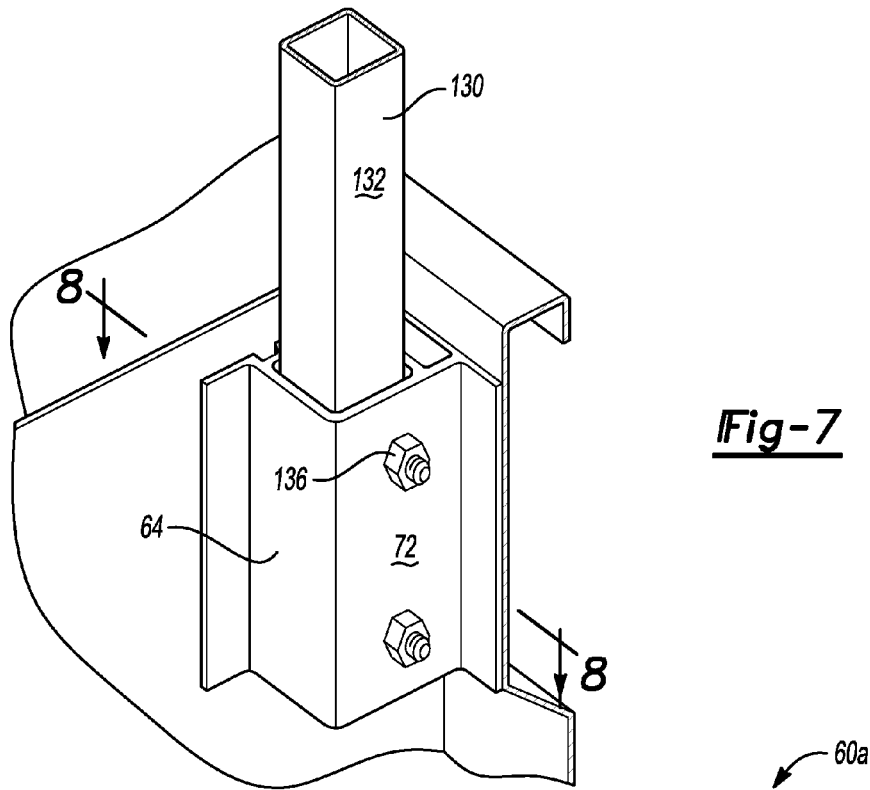
FIG. 7 is a fragmentary perspective view of an elongate member attached to the stake-pocket assembly.
Figure 8:
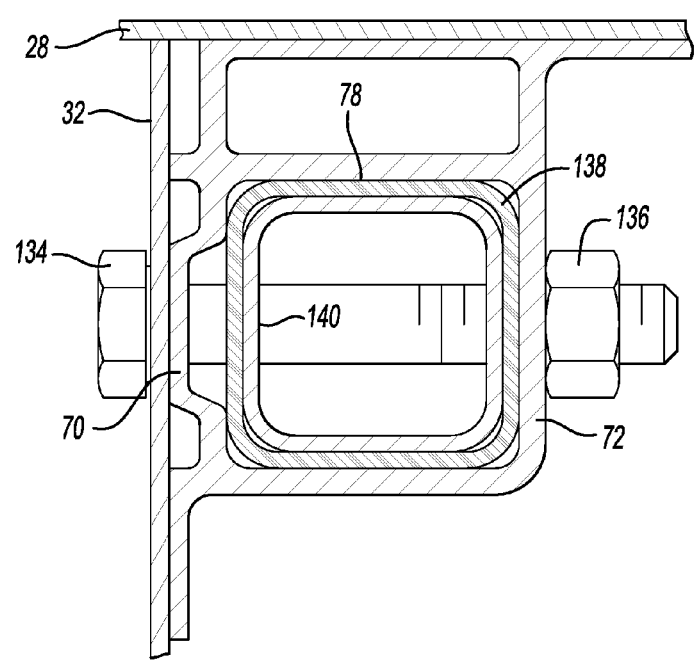
FIG. 8 is a cross-sectional view taken along the line 8-8 in FIG. 7.

Referring to FIGS. 7 and 8, an elongate member 130 of an aftermarket accessory is received in the state-pocket assembly 60a to attach the aftermarket accessory to the box 16. The elongate member 130 includes an outer surface or surfaces 132 that engage the accessory-engaging surfaces of the bracket 64. Vehicle manufacturers may release dimensions for the assembly 60 to encourage aftermarket manufacturers to produce elongate members 130 designed to tightly fit within the brackets. An adapter 138 may be used to tightly fit the elongate member 130 in the bracket 64 if the diameter of the elongate member 130 is smaller than the opening 78, or the shapes are not the same. The adapter 138 may be a sleeve member made of plastic, rubber, metal, composite, or other suitable material.

The sidewalls of the bracket 64 prevent lateral movement of the elongate member 130, but an interlocking member may be required to prevent vertical movement of the elongate member 130. The interlocking member may be any feature that prevents the elongate member 130 from moving vertically within the bracket. In the illustrated embodiment, at least one fastener 134 vertically locks the elongate member 130 within the bracket 64. The fastener 134 may be a bolt that threads into a nut 136 welded onto the outboard sidewall 72. A hole 140 is defined by the inner panel 32, the inboard sidewall 70, the outboard sidewall 72, and the elongate member 130 to allow the fastener 134 to be inserted into the nut 136.

Figure 9:
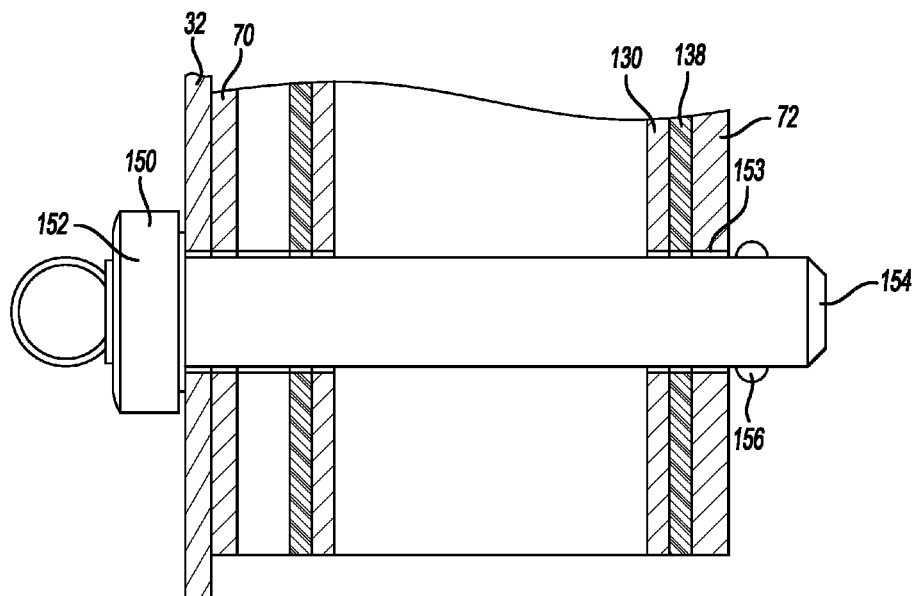
FIG. 9 is a fragmentary partial cross-sectional view of a sidewall of the box illustrating a pin connection between the bracket and the elongate member.

FIG. 9 illustrates another type of interlocking member that may be used to lock the elongate member 130 in the bracket 64. The interlocking member is a quick-connect pin 150 that is inserted through the inner panel 32, the bracket 64, and the elongate member 130 via a plurality of clearance holes 153 that are vertically aligned with each other when the elongate member is positioned in the correct location. The pin is inserted into the assembly from inside the box. The pin 150 may include a head 152 that is disposed against the inner panel 32 and a distal end 154 that extends past the outboard sidewall 72. Spring-loaded detents 156 located near the distal end 152 prevent the pin 150 from inadvertently being removed from the assembly.

Figure 10:
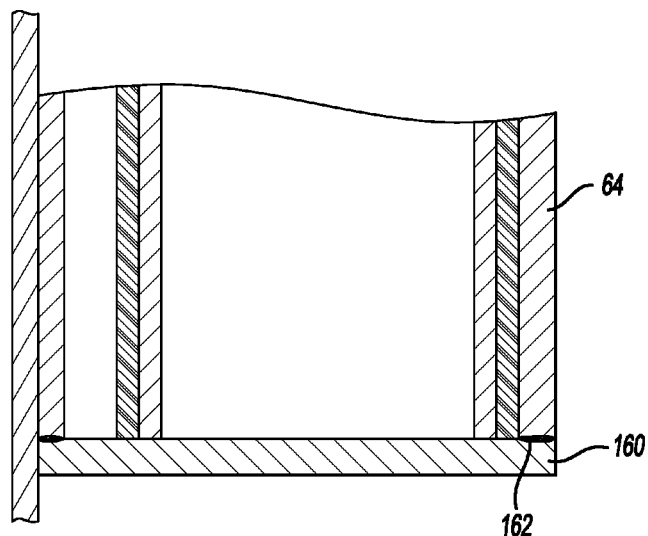
FIG. 10 is a fragmentary cross-sectional view of a sidewall of the box illustrating a bottom plate welded to a bottom of the bracket.

FIG. 10 illustrates another type of interlocking member that may be used to vertically support the elongate member 130. Here, the interlocking member is a bottom plate 160 attached to a bottom of the bracket 64. The bottom plate 160 may be attached to the bracket by welding 162. The bottom plate 160 may also be attached to the bracket 64 by adhesive, fasteners or other joining techniques depending upon the materials being used. It is to be understood that more than one interlocking member may be used simultaneously.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A pickup-truck box comprising:
a bed;
a sidewall connected to a longitudinal side of the bed and including an inner panel, an outer panel, and a top rail defining a stake-pocket hole and extending between the panels to define a sidewall interior, the stake-pocket hole including an inboard periphery that is laterally offset from the inner panel; and
a stake-pocket bracket including a tubular body defining an opening, wherein the bracket is disposed within the sidewall interior with a first side of the tubular body secured to the inner panel at a location that vertical aligns the opening with the hole to receive an object within the opening, and an inboard object-engaging surface of the body is laterally offset from the inner panel at a distance greater than or equal to the inboard periphery of the stake-pocket hole.

2. The pickup-truck box of claim 1, wherein the body further defines a standoff projecting inwardly from the first side to engage the inner panel.

3. The pickup-truck box of claim 1 further comprising a header connected to the sidewall and including an inner panel defining a front wall of the sidewall interior, wherein the body further includes a second side mounted to the inner panel of the header.

4. The pickup-truck box of claim 1, wherein the body further includes an interlocking member that holds an object received in the bracket a selected vertical position in the bracket.

5. The pickup-truck box of claim 1, wherein the tubular body has a rectangular cross section.

6. The pickup-truck box of claim 1, wherein the inner panel and the body define apertures arranged to allow an interlocking member to be inserted into the opening from inside the box.

7. A pickup-truck box comprising:
a sidewall defining a stake-pocket hole in a top rail that spans inner and outer panels; and
a stake-pocket bracket disposed inside the sidewall below the hole such that an object inserted into the hole is received within a tubular sleeve of the bracket, wherein the bracket is formed of extruded metal and the sleeve includes an inboard side having a part engaging surface that is outboard of the inner panel.

8. The pickup-truck box of claim 7, wherein the stake-pocket hole further includes a periphery having an inboard side, wherein a distance between the inner panel and the part engaging surface is greater than or equal to a distance between the inner panel and the inboard side of the hole.

9. The pickup-truck box of claim 7, wherein the bracket is mounted to the inner panel.

10. The pickup-truck box of claim 7, wherein the sleeve further includes an outboard side, a front side, and a rear side connected to the inboard side, wherein the tubular sleeve has a rectangular cross section.

11. The pickup-truck box of claim 7, wherein a cross-sectional area of an opening of the sleeve is less than or equal to a cross-sectional area of the stake-pocket hole.

12. The pickup-truck box of claim 7, wherein the sidewall further includes a second a stake-pocket hole in the top rail, and a second stake-pocket bracket disposed inside the sidewall below the second hole such that an object inserted into the second hole is received within a tubular sleeve of the second bracket, wherein the sleeve includes an inboard side having a part engaging surface that is outboard of the inner panel.

13. The pickup-truck box of claim 12, wherein the second stake-pocket hole further includes an inboard side, wherein a distance between the inner panel and the part engaging surface of the second bracket is greater than or equal to a distance between the inner panel and the inboard side of the second hole.

14. The pickup-truck box of claim 7 further comprising an interlocking member that vertically secures an object received in the sleeve.

15. A pickup truck comprising:
a frame; and
a box supported by the frame and including a header, a pair of longitudinal sidewalls extending rearwardly from the header, and a bed connected to the header and sidewalls, wherein at least one of the sidewalls includes:
inner and outer panels spaced apart to define an interior,
a top rail spanning the inner and outer panels, the top rail defining a stake-pocket hole providing access into the interior, the stake-pocket hole including a periphery having an inboard side, and
a bracket disposed in the sidewall and including a sleeve having an inboard part engaging surface configured to engage an inboard surface of an elongate member received in the sleeve, wherein a distance between the inner panel and the inboard engaging surface is greater than or equal to a distance between the inner panel and the inboard side of the hole.

16. The pickup truck of claim 15, wherein the inner panel and the sleeve each define holes that are aligned to receive an interlocking member.

17. The pickup truck of claim 15 further comprising a box accessory including the elongate member, where the elongate member extends through the stake-pocket hole and is disposed in the sleeve.

* * * * *